(12) United States Patent
Whytock et al.

(10) Patent No.: US 8,289,288 B2
(45) Date of Patent: Oct. 16, 2012

(54) VIRTUAL OBJECT ADJUSTMENT VIA PHYSICAL OBJECT DETECTION

(75) Inventors: Chris Whytock, Seattle, WA (US); Carlos Pessoa, Redmond, WA (US); Paul Armistead Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 12/354,166

(22) Filed: Jan. 15, 2009

(65) Prior Publication Data

US 2010/0177931 A1  Jul. 15, 2010

(51) Int. Cl.
 *G06K 9/00* (2006.01)
(52) U.S. Cl. ............... 345/173; 345/175; 715/863
(58) Field of Classification Search .............. 345/173
 See application file for complete search history.

(56) References Cited

U.S. PATENT DOCUMENTS

| | | | |
|---|---|---|---|
| 5,561,445 A * | 10/1996 | Miwa et al. ............... | 345/163 |
| 5,844,547 A * | 12/1998 | Minakuchi et al. ......... | 345/173 |
| 6,188,405 B1 | 2/2001 | Czerwinski et al. | |
| 7,248,248 B2 | 7/2007 | Lampson | |
| 7,278,115 B1 | 10/2007 | Conway et al. | |
| 7,877,707 B2 * | 1/2011 | Westerman et al. ......... | 715/863 |
| 7,924,271 B2 * | 4/2011 | Christie et al. ............. | 345/173 |
| 2004/0046799 A1 | 3/2004 | Gombert et al. | |
| 2004/0056894 A1 | 3/2004 | Zaika et al. | |
| 2006/0026535 A1 * | 2/2006 | Hotelling et al. ........... | 715/863 |
| 2007/0120846 A1 | 5/2007 | Ok et al. | |
| 2007/0130529 A1 | 6/2007 | Shrubsole | |
| 2007/0188518 A1 * | 8/2007 | Vale et al. ................. | 345/619 |
| 2007/0220444 A1 * | 9/2007 | Sunday et al. .............. | 715/788 |
| 2007/0300182 A1 | 12/2007 | Bilow | |
| 2008/0040692 A1 * | 2/2008 | Sunday et al. .............. | 715/863 |
| 2008/0222545 A1 | 9/2008 | Lemay et al. | |
| 2008/0273755 A1 * | 11/2008 | Hildreth .................... | 382/103 |
| 2009/0135162 A1 * | 5/2009 | Van De Wijdeven et al. | 345/175 |
| 2010/0141589 A1 * | 6/2010 | Hoover ..................... | 345/173 |
| 2010/0146387 A1 * | 6/2010 | Hoover ..................... | 715/702 |
| 2010/0177931 A1 * | 7/2010 | Whytock et al. ............ | 382/103 |
| 2011/0134047 A1 * | 6/2011 | Wigdor et al. .............. | 345/173 |
| 2011/0145706 A1 * | 6/2011 | Wilson et al. .............. | 715/702 |

OTHER PUBLICATIONS

Georgel, et al., "A Novel Approach to Automatic Layout for User Interface Elements in Augmented Reality", Retrieved at <<http://campar.in.turn.de/pub/georgel2005ismar/george/2005ismar.pdf>>, p. 1.
Jetsu, Ilja, "Tangible User Interfaces and Programming", Retrieved at <<ftp://ftp.cs.joensuu.fi/pub/Theses/2008_MSc_Jetsu_Ilja.pdf>>, Feb. 1, 2008, pp. 70.

* cited by examiner

*Primary Examiner* — Van Chow
(74) *Attorney, Agent, or Firm* — Alleman Hall McCoy Russell & Tuttle LLP

(57) ABSTRACT

Various embodiments related to the location and adjustment of a virtual object on a display in response to a detected physical object are disclosed. One disclosed embodiment provides a computing device comprising a multi-touch display, a processor and memory comprising instructions executable by the processor to display on the display a virtual object, to detect a change in relative location between the virtual object and a physical object that constrains a viewable area of the display, and to adjust a location of the virtual object on the display in response to detecting the change in relative location between the virtual object and the physical object.

13 Claims, 6 Drawing Sheets

VIRTUAL OBJECT ADJUSTMENT VIA PHYSICAL OBJECT DETECTION

BACKGROUND

Touch-sensitive displays are configured to accept inputs in the form of touches, and in some cases near-touches, of objects on a surface of the display. Touch-sensitive displays may use various mechanisms to detect touches, including but not limited to optical, resistive, and capacitive mechanisms. Further, some touch-sensitive displays may be configured to detect a plurality of temporally overlapping touches. These displays, which may be referred to as multi-touch displays, may allow for a greater range of input touches and gestures than a display configured to accept a single touch at a time.

Oftentimes, an application running on a computing device with a touch-sensitive display may display a virtual object in response to detecting a touch of a physical object on the display. For example, upon detecting a touch of an object on the display, a menu comprising a set of selectable menu options may be displayed for a user. In the case of a multi-touch display, a plurality of physical objects and corresponding virtual objects may be displayed on the display at any time.

SUMMARY

Accordingly, various embodiments related to the location and adjustment of a virtual object on a display in response to a detected physical object are disclosed herein. For example, one disclosed embodiment provides a computing device comprising a multi-touch display, a processor and memory comprising instructions executable by the processor to display on the display a virtual object, to detect a change in relative location between the virtual object and a physical object that constrains a viewable area of the display, and to adjust a location of the virtual object on the display in response to detecting the change in relative location between the virtual object and the physical object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, multi-touch displays may be configured to detect multiple physical objects located on the surface of such displays. Further, oftentimes upon detecting such a physical object, a corresponding virtual object, such as a user interface menu, may be displayed on the multi-touch display in response. However, where multiple physical objects are located on the display at one time, it is possible that one physical object may obscure a virtual object associated with another physical object. Further, other situations may exist where it is desirable to adjust the location of a virtual object in response to a location of a physical object that constrains a viewable area of the display. Therefore, various embodiments are disclosed herein related to the adjustment of a location of a virtual object displayed on a user interface in response to a physical object. Before discussing these embodiments in detail, an example use environment is described.

Figure 1:
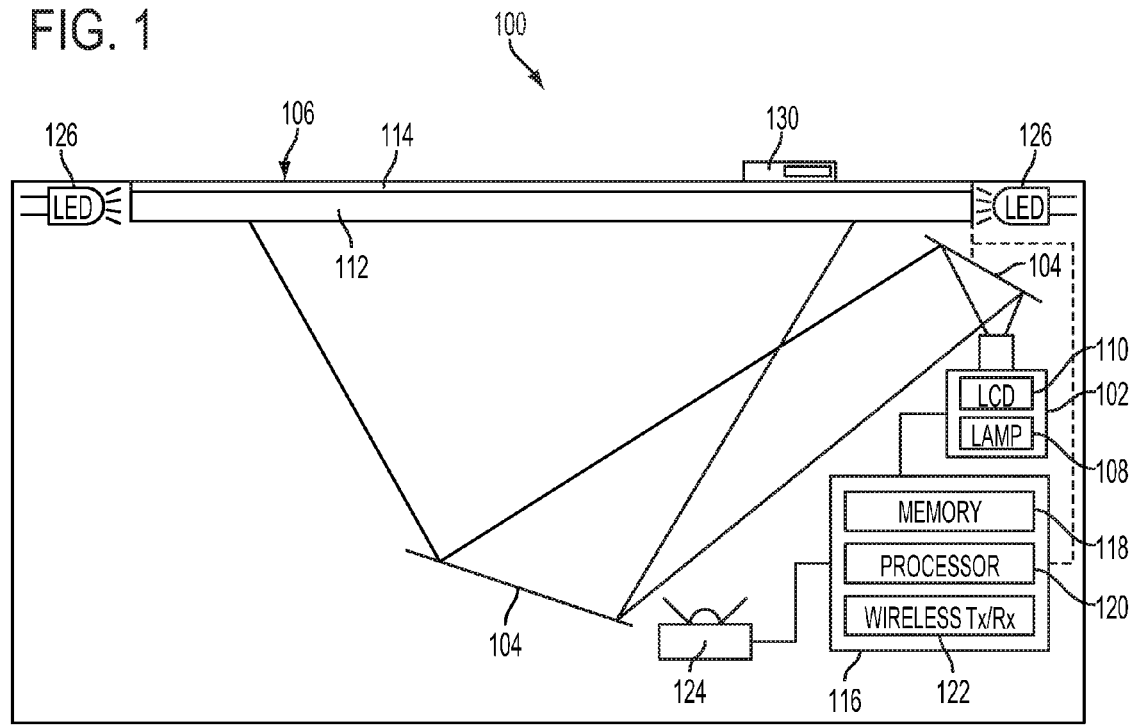
FIG. 1 shows a block diagram of an embodiment of a computing device comprising a multi-touch display.

FIG. 1 shows a schematic depiction of an interactive display device 100. The interactive display device 100 comprises a projection display system having an image source 102, optionally one or more mirrors 104 for increasing an optical path length and image size of the projection display, and a display screen 106 onto which images are projected. While shown in the context of a projection display system, it will be understood that an interactive display device may comprise any other suitable image display system, including but not limited to liquid crystal display panel systems. Furthermore, while the disclosed embodiments are described in the context of a vision-based multi-touch display system, it will be understood that the embodiments may be implemented on any other suitable touch-sensitive display system, including but not limited to capacitive and resistive systems.

The image source 102 includes an optical or light source 108 such as the depicted lamp, an LED array, or other suitable light source. The image source 102 also includes an image-producing element 110 such as the depicted LCD (liquid crystal display), an LCOS (liquid crystal on silicon) display, a DLP (digital light processing) display, or any other suitable image-producing element. The display screen 106 includes a clear, transparent portion 112, such as sheet of glass, and a diffuser screen layer 114 disposed on top of the clear, transparent portion 112. In some embodiments, an additional transparent layer (not shown) may be disposed over the diffuser screen layer 114 to provide a smooth look and feel to the display screen.

Continuing with FIG. 1, the interactive display device 100 further includes an electronic controller 116 comprising memory 118 and a microprocessor 120. The controller 116 may include a wireless transmitter and receiver 122 configured to communicate with other devices. The controller 116 also may include computer-executable instructions or code, such as programs, stored in memory 118 or on other computer-readable storage media and executed by microprocessor 120, that control the various embodiments of adjusting a position of a virtual object described in more detail below. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

To sense objects located on the display screen 106, the interactive display device 100 includes one or more image capture devices 124 configured to capture an image of the entire backside of the display screen 106, and to provide the image to the electronic controller 116 for the detection of objects appearing in the image. The diffuser screen layer 114 helps to avoid the imaging of objects that are not in contact with or positioned within a few millimeters of the display screen 106, and therefore helps to ensure that objects that are touching the display screen 106 are detected by the image capture device 124.

The image capture device 124 may include any suitable image sensing mechanism. Examples of suitable image sensing mechanisms include but are not limited to CCD and CMOS image sensors. Further, the image sensing mechanisms may capture images of the display screen 106 at a sufficient frequency or frame rate to detect motion of an object across the display screen 106. In other embodiments, a scanning laser may be used in combination with a suitable photodetector to acquire images of the display screen 106.

The image capture device 124 may be configured to detect reflected or emitted energy of any suitable wavelength, including but not limited to infrared and visible wavelengths. To assist in detecting objects placed on the display screen 106, the image capture device 124 may further include an additional light source 126 such as one or more light emitting diodes (LEDs) configured to produce infrared or visible light. Light from the light source 126 may be reflected by objects placed on the display screen 106 and then detected by the image capture device 124. The use of infrared LEDs as opposed to visible LEDs may help to avoid washing out the appearance of projected images on the display screen 106.

FIG. 1 also depicts a physical object 130, such as a cell phone or camera, that has been placed on the display screen 106. It will be understood that the interactive display device 100 may be used to detect any suitable physical object, including but not limited to, fingers, styluses, cell phones, cameras, other portable electronic consumer devices, barcodes and other optically readable tags, etc.

Figure 2:
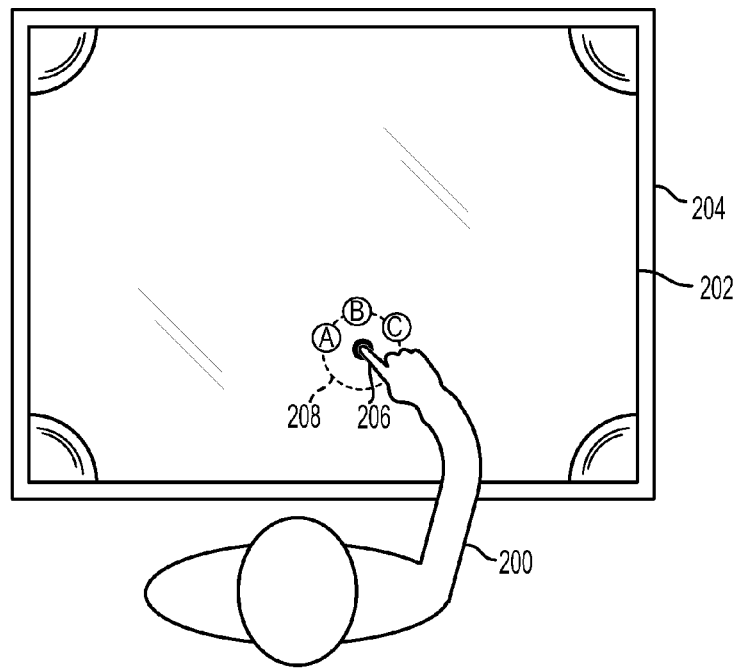
FIG. 2 shows a schematic view of a user interacting with an embodiment of a multi-touch display.

As described above, upon detecting a physical object on a display surface, an interactive multi-touch display such as interactive display device 100 may be configured to display a set of selectable menu options associated with the physical object. FIG. 2 shows a schematic view of a user 200 interacting with a surface 202 of an embodiment of a multi-touch display 204 with a finger 206. Upon detecting the touch of the finger 206 on the surface 202, the multi-touch display 204 displays a virtual image 208 on the multi-touch display 204. The depicted virtual image 208 comprises a contextual menu presenting the user 200 with selectable options A, B, and C. It will be understood that the contextual menu is an example of one type of virtual object that may be associated with a physical object, and that any other suitable virtual object may be used.

As described above, where a physical object is located on the surface of a display on which a virtual object is displayed, the virtual object may become obscured by the physical object on the surface, or by edges of the display (which also may be considered physical objects). Therefore, to avoid such problems with the visibility of the virtual object, the position of the virtual object may be adjusted in response to the physical object in cases where the virtual object would otherwise be obscured by the physical object.

Figure 3:
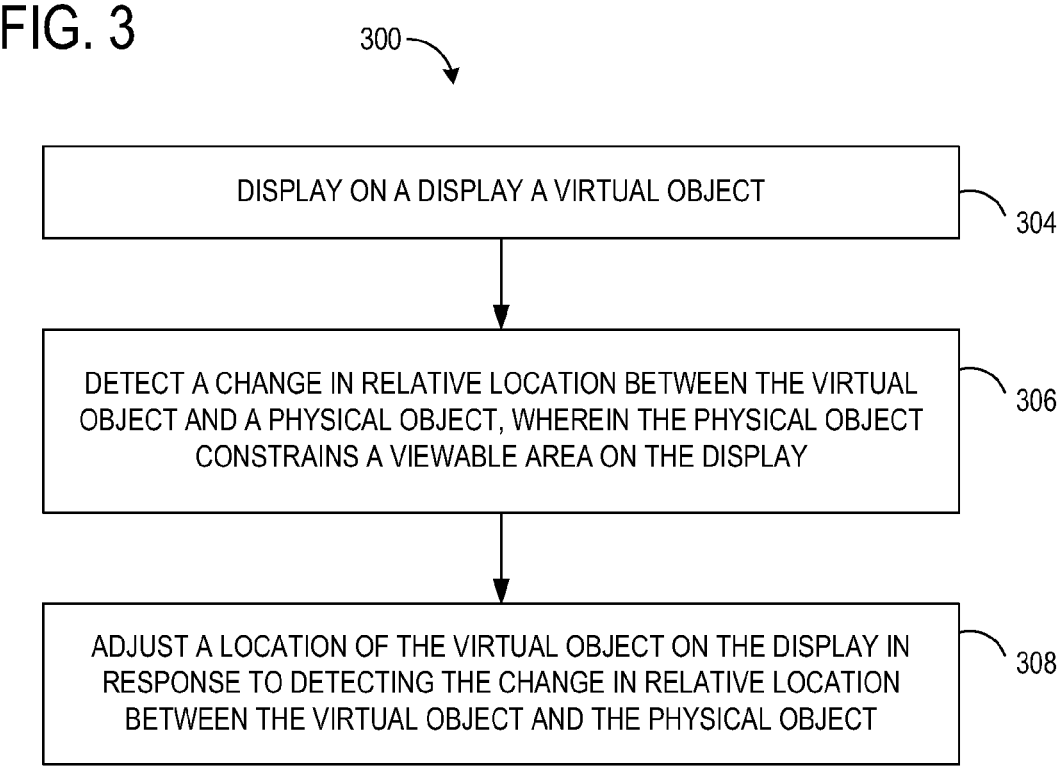
FIG. 3 shows a flow diagram of an embodiment of a method of adjusting a location of a virtual object displayed on a multi-touch display in response to a physical object that constrains a viewable area of the display.

FIG. 3 shows an embodiment of a method 300 of adjusting a location of a virtual object displayed on a multi-touch display in response to a physical object located on the multi-touch display. First at 304, method 300 includes displaying on the display a virtual object. Next, at 306, method 300 includes detecting a change in relative location between the virtual object and a physical object that constrains a viewable area of the display. In some embodiments, the physical object may be located on the display, as described in more detail in the context of FIG. 4. In other embodiments, the second physical object comprises an edge of the display, as described later in the context of FIG. 6. Continuing with FIG. 3, method 300 next comprises, at 308, adjusting a location of the virtual object on the display in response to detecting the change in relative location between the virtual object and the physical object.

In this manner, the virtual object may avoid being obscured by the physical object. This may help to maintain a fully visible layout of virtual objects on the multi-touch display, allowing the user to view multiple virtual objects in their entireties without blockage by physical objects. This may help to avoid manual adjustment of virtual objects, and therefore lead to a more efficient user experience.

Figure 4:
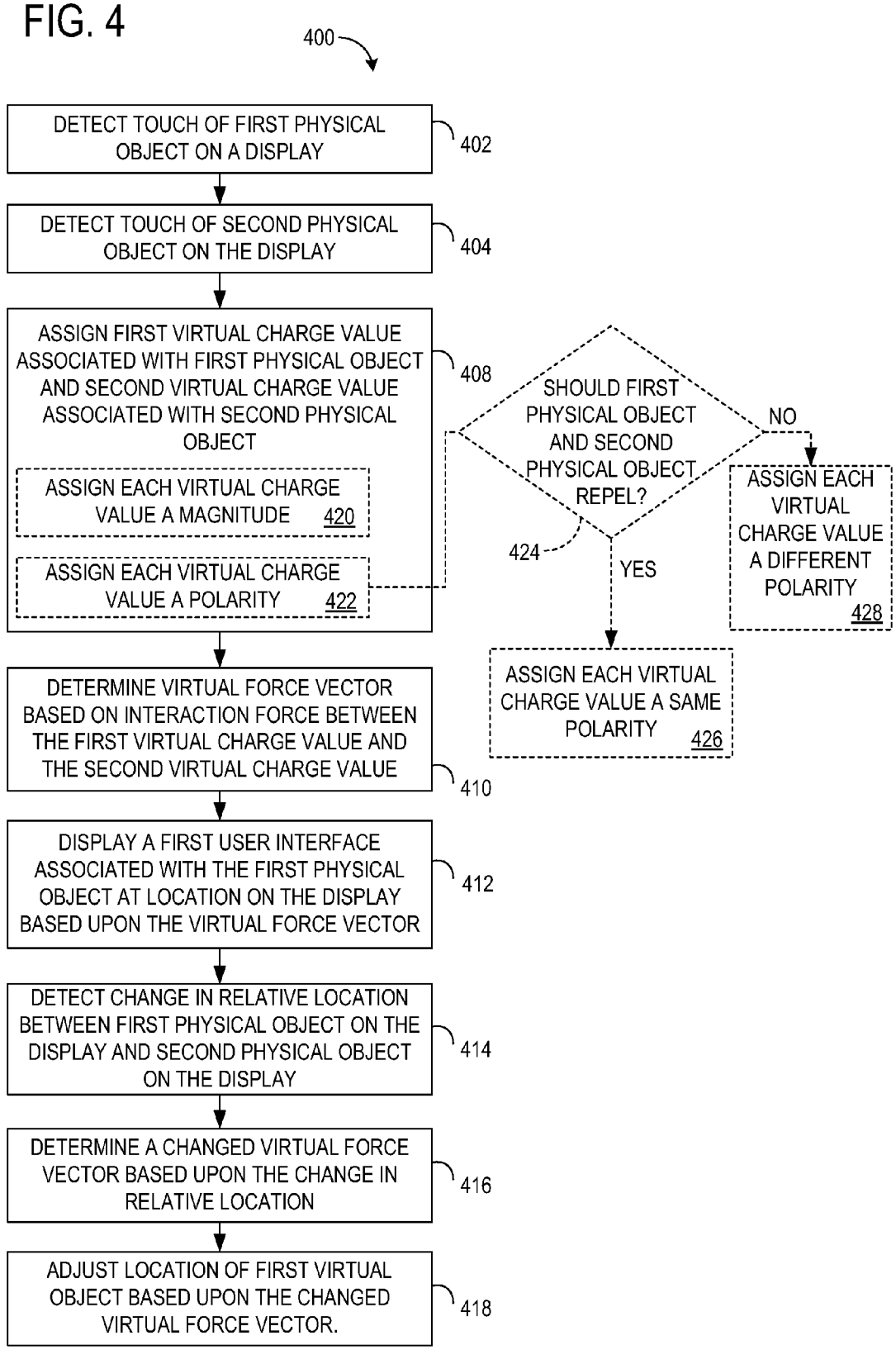
FIG. 4 shows a flow diagram of another embodiment of a method of adjusting a location of a virtual object displayed on a multi-touch display in response to a physical object located on the multi-touch display.

FIG. 4 shows another embodiment of a method 400 of adjusting a location of a virtual object displayed on a multi-touch display in response to a physical object located on the multi-touch display. First, at 402, method 400 includes detecting a touch of a first physical object on a display. At 404, method 400 includes detecting a touch of a second physical object on the display. The first and/or second physical object each may be any suitable physical object, such as a user's finger, or other physical object as described above.

Next, at 408, method 400 includes assigning a first virtual charge value associated with the first physical object and/or first virtual object, and a second virtual charge value associated with the second physical object and/or second virtual object. Such an approach allows the multi-touch display to determine an interaction force between the two physical object/virtual object pairs, as described hereafter, to allow the virtual objects to be positioned at locations spaced from nearby physical objects. Any suitable relationship may be used to determine an interaction force between two physical objects. In one example, a calculation that utilizes an inverse square relationship, such as Coulomb's law, may be used to determine the interaction force. An example of Coulomb's law is shown below, $$F = k\frac{q_1 q_2}{r^2},$$

where F represents an interaction force between two objects, namely a first object with an associated charge value $q_1$ and a second object with an associated charge value of $q_2$, where the two objects are separated by a distance r, and k is a constant of proportionality.

In other embodiments, any other suitable mathematical relationship may be used. It will be understood that a virtual charge "associated with" a physical object and/or corresponding virtual object may be located in any suitable position relative to the physical and virtual objects, including but not limited to at a location of the virtual object, directly under the physical object, and/or in any other suitable location.

Further, method 400 at 408 may optionally include, at 420, assigning each virtual charge value a magnitude. In some embodiments, the first virtual charge value and the second virtual charge value may be of equivalent magnitudes. In other embodiments, the first virtual charge value and the second virtual charge value may be of different magnitudes. For example, in one embodiment, the first virtual charge value associated with the first physical object may be three times the magnitude of the second virtual charge value associated with the second physical object. This may be used where it is desired for a virtual object associated with one physical object to more strongly avoid another physical object, or in some situations, to be strongly attracted to another physical object. For example, due to the relatively tight geometric space of a display surface corner, the display surface corner may be assigned a higher virtual charge value of a same sign as a virtual charge value assigned to a physical object located on the display screen. In this manner, a menu or other virtual object associated with a physical object may begin to move away from a corner more strongly at a greater distance from the corner than where the corner and physical object have virtual charge values of the same magnitude.

Further, method 400 at 408 may optionally include, at 422, assigning each virtual charge value a polarity. In some embodiments, the polarity may be assigned by first determining if the first physical object and the second physical object should repel, as shown at 424 of FIG. 4. In such cases, if it is determined at 424 that the first and second physical objects should repel, then the first physical object and the second physical object may be assigned a first virtual charge value and a second virtual charge value, respectively, of a same polarity, as shown at 426. If instead at 424 it is determined that the first and second physical objects should not repel (i.e. the first and second physical objects should attract), then the first physical object and the second physical object may be assigned a first virtual charge value and a second virtual charge value, respectively, of a different polarity. For example, virtual charge values of a same polarity may be assigned where it is desired to have physical objects repel so that associated virtual objects are obscured on the display. In another example, a virtual object and an edge of a display nearest a user may be assigned virtual charge values of different polarities, so that the virtual object is attracted to the edge to thereby orient the virtual object for viewing by the user. Example use environments for each of these embodiments are described in more detail below.

Continuing with FIG. 4, at 410, method 400 includes determining a virtual force vector based on an interaction force between the first virtual charge value and the second virtual charge value. As described above, the virtual force vector may be calculated in any suitable manner, such as by using an inverse square relationship such as Coulomb's Law, which treats the first virtual charge value and the second virtual charge value as electrostatic charge values. Alternatively, any other suitable interaction force may be used. For example, a Newtonian gravitational force relationship may be used to determine an interaction force by assigning each physical object an associated "virtual mass" value. An example of a Newtonian gravitational force relationship is shown below, $$F = G\frac{m_1 m_2}{r^2},$$

where F represents an interaction force between two objects, namely a first object with an associated mass value of $m_1$ and a second object with an associated mass value of $m_2$, where the two objects are separated by a distance r, and G is a constant of proportionality.

Next, at 412, method 400 includes displaying a virtual object, such as a first user interface associated with the first physical object, at a location on the display based upon the virtual force vector. For example, as described above, upon detecting a touch of a user's finger on the surface, the multi-touch display may in response display a user interface for the user, such as a contextual menu. Whether the first user interface is moved toward the virtual force vector based on the interaction force acting on the first physical object due to the second virtual charge value or a second virtual force vector based on an interaction force acting on the second physical object due to the first virtual charge value may depend upon the specific design of the user interface, and which direction of movement would result in the user interface moving toward or away from the physical object. For example, in some embodiments the first user interface may be located in a direction of the virtual force vector. In other embodiments the first user interface may be located in a direction opposite of the virtual force vector, or in any other direction based on the virtual force vector.

In some embodiments, each physical object may be assigned a default orientation vector that gives the virtual object associated with the physical object a default orientation that is overcome when other physical objects come into close proximity. In this manner, the position of virtual objects may be stabilized, and may avoid constantly re-adjusting due to constantly changing locational relationships between the physical object and other physical objects. Therefore, in such embodiments, the virtual force vector includes the default orientation vector as a component of the vector sum of all of the interactions with other physical objects. Careful election of the magnitude of the default orientation vector may allow adjustment of the user interface or other virtual object associated with a physical object to begin when another physical object comes within a pre-selected distance of the physical object.

The default orientation vector may have any suitable direction. In some embodiments, the default orientation vector for a physical object may have a direction that biases a virtual object associated with the physical object toward a user, toward an edge of the display, or in any other suitable direction.

In yet other embodiments, the default orientation vector may have a variable magnitude. For example, where the virtual object is a contextual menu, the magnitude of the default orientation vector may decrease with an increasing number of menu items. This is because menus with larger numbers of menu items may have a higher likelihood of being obscured by another physical object than menus containing smaller numbers of menu items. In this manner, contextual menus with larger numbers of menu items may begin to move away from an approaching physical object sooner than contextual menus with smaller numbers of menu items.

Continuing with FIG. 4, at 414, method 400 includes detecting a change in relative location between the first physical object on the display and the second physical object on the display. Upon detecting the change in relative location, method 400 next includes, at 416, determining a changed virtual force vector based upon the change in relative location, and at 418, adjusting a location of the first virtual object based upon the changed virtual force vector in the manner described above.

Figure 5:
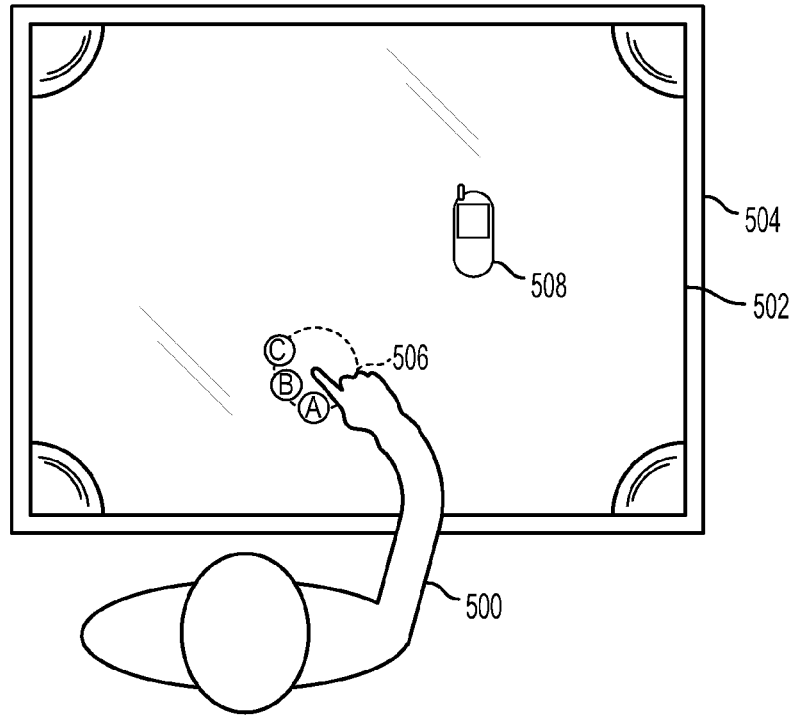
FIG. 5 shows a schematic view of a user and a second physical object interacting with an embodiment of a multi-touch display.

FIG. 5 shows a schematic view of a user 500 and a mobile phone 508 interacting with an embodiment of a multi-touch display 504. As shown, user 500 interacts with a surface 502 of multi-touch display 504 with a first physical object, namely the user's finger. Upon detecting a touch of the finger of user 500 on surface 502 and detecting a touch of mobile phone 508 on surface 502, a relative location between the finger of user 500 and mobile phone 508 may be determined. A virtual object associated with either the finger of user 500 or mobile phone 508 may then be displayed on multi-touch display 504 at a location on multi-touch display 504 based upon the determined relative location. For example, as shown in FIG. 5, a virtual object 506 associated with the finger of user 500 is displayed on surface 502. As depicted, virtual object 506 is a contextual menu with selectable menu options A, B, and C. As further shown in FIG. 5, virtual object 506 was displayed based on the determined relative location between the finger of user 500 and mobile phone 508, such that virtual object 506 would not be obscured by mobile phone 508. In some cases, the location of virtual object 506 may be further adjusted in response to detecting a change in the relative location between the finger of user 500 and mobile phone 508.

Figure 6:
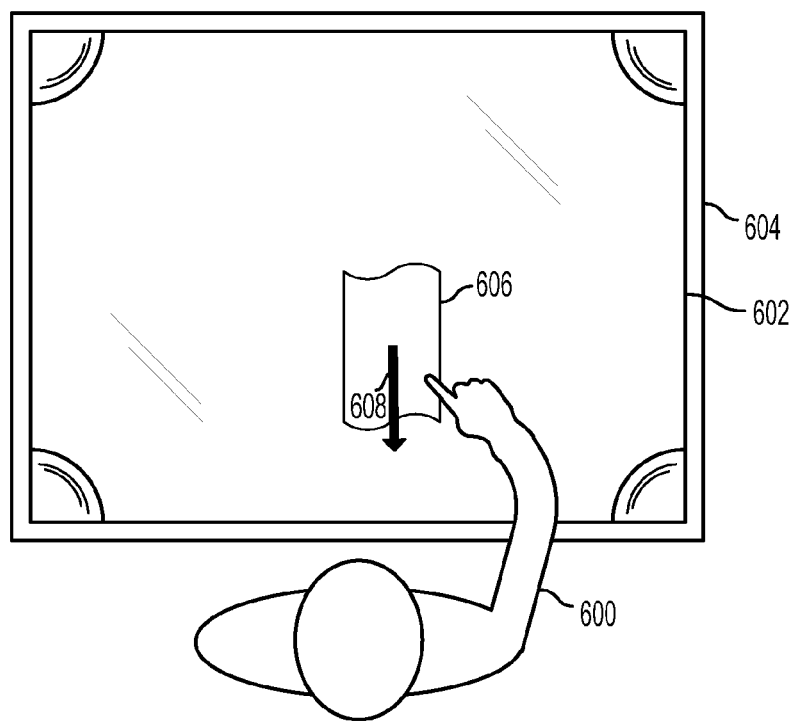
FIG. 6 shows another schematic view of a user interacting with an embodiment of a multi-touch display.

FIG. 6 shows another schematic view of a user interacting with an embodiment of a multi-touch display. As shown, the user 600 interacts with a surface 602 of the multi-touch display 604 with a first physical object, namely the user's finger. Upon detecting the finger of the user 600 on the surface 602, the multi-touch display 604 may display a virtual object 606, shown in the depicted example as an electronic document. The multi-touch display 604 may then assign electrostatic charge values of a different polarity to be associated with the finger of user 600 at a location of the virtual object 606, and to be associated with an edge of display 604 closest to the user 600. Upon doing so, multi-touch display 604 may determine a virtual force vector 608 based on an interaction force acting on the finger of user 600 at a location of the virtual object 606 due to the electrostatic charge associated with the edge of the display 604 closest to user 600. The edge of the display closest to the user may be determined in any suitable manner, including be not limited to from an orientation of the user's finger.

Figure 7:
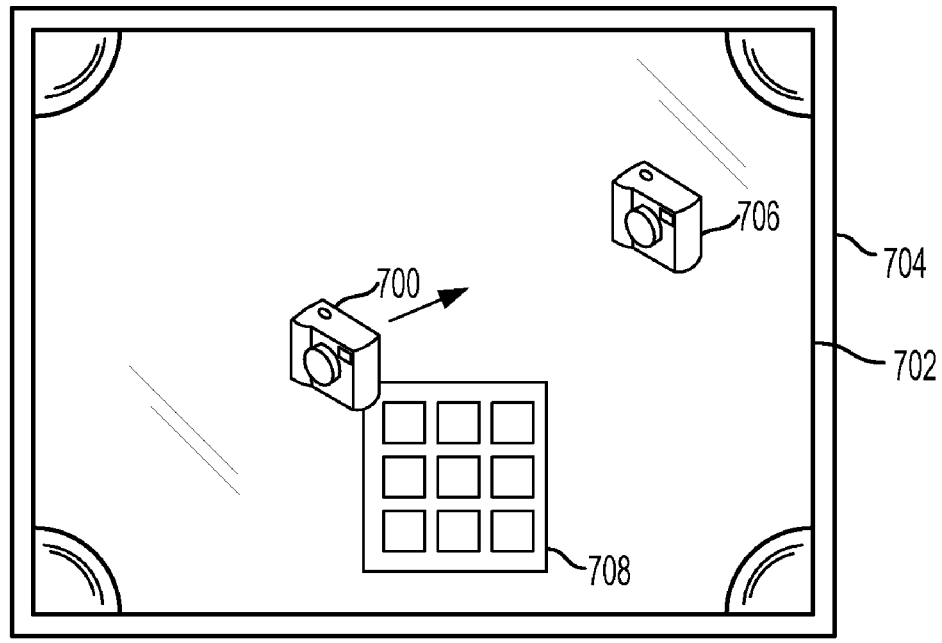
FIG. 7 shows a schematic view of two physical objects interacting with an embodiment of a multi-touch display.

Next, FIG. 7 shows a schematic view of two physical objects interacting with an embodiment of a multi-touch display. As shown, the first and second physical objects are each digital cameras 700 and 706, respectively. Upon detecting the digital camera 700 on surface 702, the multi-touch display 704 may display a virtual object 708, such as a contextual menu related to the camera, a list of features of the camera, an electronic index sheet of images to be downloaded from digital camera 700, etc.

Figure 8:
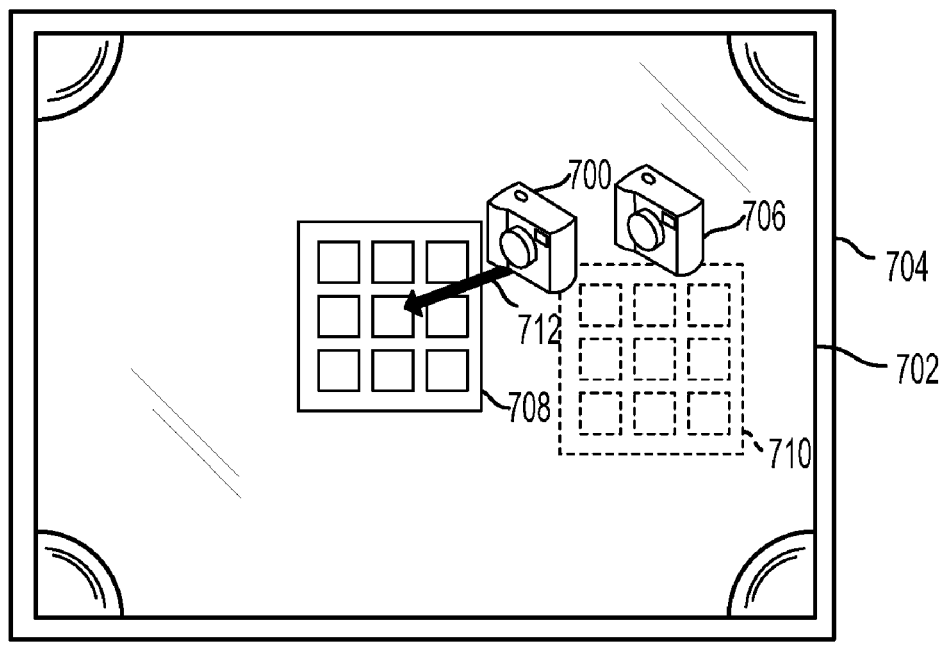
FIG. 8 shows another schematic view of the embodiment shown in FIG. 7, where a changed virtual force vector is determined and used to adjust a location of a first virtual object associated with the first physical object in response to a change in relative location between the first physical object and another physical object.

Next, if the first digital camera 700 is moved in a direction toward the second digital camera 706, as depicted in FIG. 8, the virtual force vector resulting from the interaction between the first and second cameras causes the virtual object 708 to move away from the second digital camera 706. If the virtual object 708 associated with digital camera 700 did not move relative to digital camera 700, as shown in FIG. 8 in dashed lines, the virtual object 710 would be partially obstructed by the digital camera 706. However, by assigning virtual charge values of the same polarity to be associated with each digital camera and then adjusting the location of the virtual object 710 based upon a virtual interaction force vector 712 between the digital cameras 700 and 706, the location of virtual object 708 may move to avoid being obscured.

Figure 9:
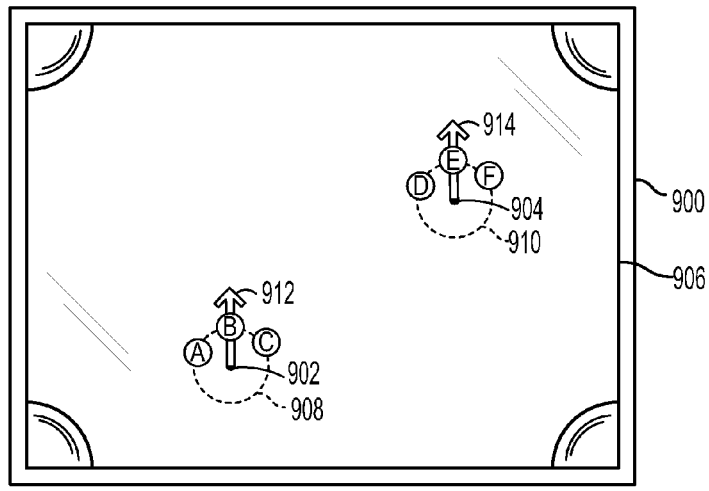
FIG. 9 shows a schematic view of two physical objects interacting with an embodiment of a multi-touch display, wherein each physical object is associated with a default orientation vector.

FIG. 9 shows a schematic view of an embodiment of a multi-touch display 900 having a first physical object 902, depicted schematically as a point, and a second physical object 904, also depicted schematically as a point, on a display surface 906. A first virtual object 908, depicted as a contextual menu with menu options A, B, and C, is associated with the first physical object 902, and a second virtual object 910, depicted as a contextual menu with menu options D, E and F, is associated with the second physical object.

Figure 10:
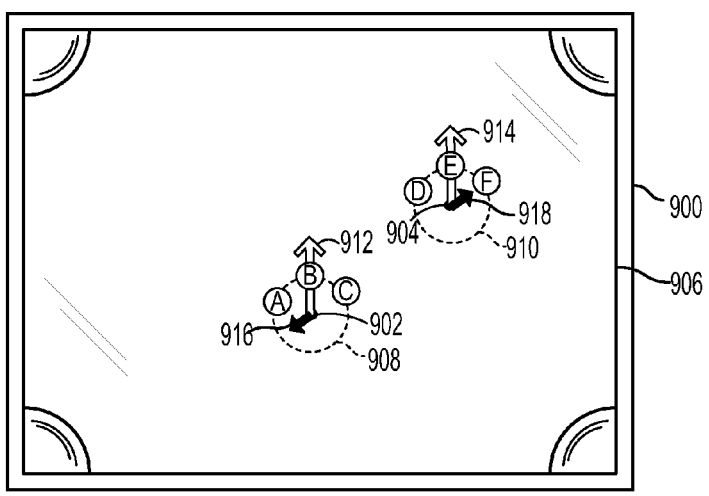
FIG. 10 shows a schematic view of the embodiment shown in FIG. 9, and shows virtual force vectors determined for each physical object.

FIG. 9 further shows a first default orientation vector 912 that multi-touch display 900 has assigned to the first physical object 902 and a second default orientation vector 914 that multi-touch display 900 has assigned to the second physical object 904. Each default orientation vector is configured to stabilize the location of the associated virtual object in a preselected direction based upon a magnitude of a distance between the first physical object 902 and the second physical object 904. As depicted in FIG. 9, where the distance between the first physical object 902 and the second physical object 904 is sufficiently large, the default orientation vectors may be much larger than the virtual force vectors due to the same-polarity virtual charge values associated with the physical objects. Thus, the virtual objects may align along the default orientation vectors, rather than in a direction due to repulsive charges between physical objects. This is shown schematically in FIG. 10, where the default orientation vectors 912, 914 are shown to be larger in magnitude than the virtual force vectors 916, 918 arising from the virtual repulsive interaction between the physical objects. Because of this relationship between the magnitudes of the virtual force vectors and the default vectors, the contextual menus have not changed location between FIGS. 9 and 10, even though the physical objects have been moved closer together.

However, depending upon the mathematical relationship used to determine the virtual force vectors, at some point as the distance between the two physical objects grows smaller, the magnitude of the virtual force vectors may become large enough to overcome the default orientation vectors, thereby resulting in adjustment of the locations of the virtual objects associated with the physical objects.

Figure 11:
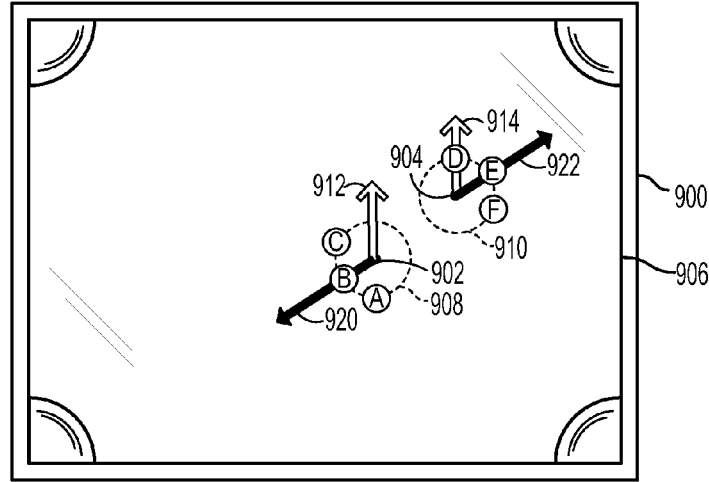
FIG. 11 shows a schematic view of the embodiment shown in FIG. 9, and shows changed virtual force vectors used to adjust the locations of the virtual objects associated with the physical objects.

FIG. 11 shows another schematic view of the first physical object 902 and the second physical object 904, where the first physical object 902 has been moved further toward the second physical object 904. As depicted, the magnitudes of changed virtual force vector 920 and changed virtual force vector 922 have increased in comparison to first virtual force vector 916 and second virtual force vector 918, respectively, as a result of the separation distance decreasing. As depicted, multi-touch display 900 has adjusted the positions of first virtual object 908 and second virtual object 910 in response to changed virtual force vector 920 and changed virtual force vector 922, respectively. Thus, the changed virtual force vectors have overtaken the default orientation vectors. Thus, first virtual object 908 and second virtual object 910 are no longer obstructed by one another.

It will be understood that the description of the interaction between physical objects as "virtual force vectors" and the quantities assigned to the physical objects as "virtual charges" are used for the purpose of convenience, and are not intended to be limiting in any manner, as other metaphors or descriptions may be used to describe a virtually determined repulsive or attractive interaction between physical objects on a touch-sensitive display for the purpose of locating a virtual object on the display. It will also be understood that animation may be used to make the movement of the virtual object more pleasing to a user than sudden, non-animated repositioning of the virtual object.

Further, it will be understood other methods than the calculation of an attractive/repulsive force between physical objects may be used to determine how to adjust a position of a virtual object on a user interface in response to a nearby physical object. For example, a "collision" test may be used, where the virtual object is moved to keep the virtual object just outside of the boundary of the nearby physical object if the virtual object boundary is determined to have intersected the boundary of the physical object due to a change in relative locations of physical objects. Likewise, a "trial and error" approach may be used to move the virtual object out of the boundary of the physical object, such that potential new locations for the virtual object are calculated on a trial-and-error basis until a location that separates the boundaries of the virtual object and the physical object is located.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computing device, comprising:
a multi-touch display;
a processor; and
memory comprising instructions executable by the processor to:
display on the display a virtual object;
assign a first virtual charge value associated with the virtual object;
assign a second virtual charge value associated with a physical object, wherein the physical object constrains a viewable area of the display;
detect a change in relative location between the virtual object and the physical object;
determine an interaction force between the first virtual charge value and the second virtual charge value; and
adjust a location of the virtual object on the display based upon the interaction force in response to detecting the change in relative location between the virtual object and the physical object.

2. The device of claim 1, wherein the physical object is located on the display.

3. The device of claim 1, wherein the physical object comprises an edge of the display.

4. The device of claim 1, wherein the instructions are executable to assign the first virtual charge value at the location of the virtual object.

5. The device of claim 1, wherein the physical object is a second physical object, wherein the virtual object is associated with a first physical object, and wherein the instructions are executable to assign the first virtual charge value at a location of the first physical object.

6. The device of claim 1, wherein the first virtual charge value and the second virtual charge value are of equivalent magnitudes.

7. The device of claim 1, wherein the first virtual charge value and the second virtual charge value are of different magnitudes.

8. The device of claim 1, wherein the first virtual charge value and the second virtual charge value are of a same polarity.

9. The device of claim 1, wherein the first virtual charge value and the second virtual charge value are of a different polarity.

10. The device of claim 1, wherein the instructions are further executable to determine a virtual force vector between the first virtual charge value and the second virtual charge value and to adjust the location of the virtual object based on the virtual force vector.

11. The device of claim 1, wherein the instructions are executable to determine the interaction force between the first virtual charge value and the second virtual charge value by treating the first virtual charge value and the second virtual charge value as electrostatic charge values.

12. The device of claim 1, wherein the instructions are further executable to assign the virtual object a default orientation vector configured to stabilize the location of the virtual object in a preselected direction based upon a magnitude of a distance between the virtual object and the physical object.

13. The device of claim 12, wherein the default orientation vector comprises a magnitude that varies based upon a number of contextual menu items contained in a contextual menu.

* * * * *